(12) United States Patent
Travaly et al.

(10) Patent No.: US 7,266,429 B2
(45) Date of Patent: Sep. 4, 2007

(54) DIGITIZATION OF FIELD ENGINEERING WORK PROCESSES AT A GAS TURBINE POWER PLANT THROUGH THE USE OF PORTABLE COMPUTING DEVICES OPERABLE IN AN ON-SITE WIRELESS LOCAL AREA NETWORK

(75) Inventors: Andrew Joseph Travaly, Ballston Spa, NY (US); Michael Brynn House, Clifton Park, NY (US); Kotesh Kummamuri Rao, Pearland, TX (US)

(73) Assignee: General Electric Company, Schenectady, NY (US)

( * ) Notice: Subject to any disclaimer, the term of this patent is extended or adjusted under 35 U.S.C. 154(b) by 962 days.

(21) Appl. No.: 09/844,270

(22) Filed: Apr. 30, 2001

(65) Prior Publication Data

US 2002/0159441 A1    Oct. 31, 2002

(51) Int. Cl.
*G05D 17/00* (2006.01)
*G05B 11/01* (2006.01)
*G05B 15/00* (2006.01)

(52) U.S. Cl. .................... 700/287; 700/17; 700/83; 700/286

(58) Field of Classification Search .................. 700/9, 700/17, 19, 22, 83, 286, 287; 701/100
See application file for complete search history.

(56) References Cited

U.S. PATENT DOCUMENTS

| | | | |
|---|---|---|---|
| 4,056,780 A | 11/1977 | Faulkner | |
| 4,284,848 A | 8/1981 | Frost | |
| 4,748,655 A | 5/1988 | Thrower et al. | |
| 5,265,150 A | 11/1993 | Helmkamp et al. | |
| 5,276,703 A | 1/1994 | Budin et al. | |
| 5,285,449 A | 2/1994 | Georgiou | |
| 5,339,316 A | 8/1994 | Diepstraten | |
| 5,408,515 A | 4/1995 | Bhagat et al. | |
| 5,442,630 A | 8/1995 | Gagliardi et al. | |
| 5,463,671 A | 10/1995 | Marsh et al. | |
| 5,530,963 A | 6/1996 | Moore et al. | |
| 5,564,072 A | 10/1996 | Aguilera et al. | |
| 5,566,225 A | 10/1996 | Haas | |
| 5,579,374 A | 11/1996 | Doi et al. | |

(Continued)

OTHER PUBLICATIONS

U.S. Appl. No. 60/258,539.*

*Primary Examiner*—Alexander Kosowski
(74) *Attorney, Agent, or Firm*—Nixon & Vanderhye P.C.

(57) ABSTRACT

A system for digitization of work processes in a power plant having a gas turbine including at least one processor system having a controller. The processor receives power plant data and the controller preferably controls the gas turbine. At least one interface device is communicatively coupled to the processor system for communicating the data received from the processor system to at least one of a mobile computing system and a computer system carried by a mobile user. The controller is capable of receiving instructions from the mobile user to control the gas turbine. The system further includes a local area network (LAN) in communication with the at least one interface device. At least one antenna assembly having a transceiver system for transmitting and receiving signals from the at least one interface device is provided. A network server system is communicatively coupled to the at least one antenna assembly via a wireless communication network, the server computer including a database for storing application data accessible by the mobile user.

13 Claims, 5 Drawing Sheets

U.S. PATENT DOCUMENTS

| | | |
|---|---|---|
| 5,602,854 A | 2/1997 | Luse et al. |
| 5,603,080 A | 2/1997 | Kallander et al. |
| 5,608,446 A | 4/1997 | Carr et al. |
| 5,655,005 A | 8/1997 | Wiedeman et al. |
| 5,657,317 A | 8/1997 | Mahany et al. |
| 5,684,801 A | 11/1997 | Amitay et al. |
| 5,696,903 A | 12/1997 | Mahany |
| 5,713,075 A | 1/1998 | Threadgill et al. |
| 5,761,425 A | 6/1998 | Miller |
| 5,765,027 A | 6/1998 | Wang et al. |
| 5,774,668 A | 6/1998 | Choquier et al. |
| 5,787,080 A | 7/1998 | Hulyalkar et al. |
| 5,796,727 A | 8/1998 | Harrison et al. |
| 5,825,759 A | 10/1998 | Liu |
| 5,842,125 A | 11/1998 | Modzelesky et al. |
| 5,864,550 A | 1/1999 | Posti |
| 5,915,207 A | 6/1999 | Dao et al. |
| 5,949,775 A | 9/1999 | Rautiola et al. |
| 5,956,331 A | 9/1999 | Rautiola et al. |
| 5,978,672 A | 11/1999 | Hartmaier et al. |
| 6,108,197 A | 8/2000 | Janik |
| 6,161,008 A | 12/2000 | Lee et al. |
| 6,167,464 A * | 12/2000 | Kretschmann ............... 710/15 |
| 6,330,482 B1 * | 12/2001 | McCain et al. ................. 700/9 |
| 6,496,477 B1 * | 12/2002 | Perkins et al. ............. 370/228 |
| 6,522,955 B1 * | 2/2003 | Colborn ..................... 700/286 |
| 6,697,951 B1 * | 2/2004 | Sinha et al. ................ 713/300 |
| 6,751,562 B1 * | 6/2004 | Blackett et al. ............... 702/61 |
| 6,757,521 B1 * | 6/2004 | Ying ....................... 455/67.11 |
| 6,792,321 B2 * | 9/2004 | Sepe, Jr. ..................... 700/65 |
| 6,882,904 B1 * | 4/2005 | Petrie et al. ................ 700/295 |
| 7,010,294 B1 * | 3/2006 | Pyotsia et al. ............. 455/420 |
| 2002/0087220 A1 * | 7/2002 | Tveit et al. ................... 700/22 |
| 2002/0107615 A1 * | 8/2002 | Bjorklund ................... 700/286 |
| 2005/0080620 A1 * | 4/2005 | Rao et al. ................... 704/226 |
| 2005/0188745 A1 * | 9/2005 | Staphanos et al. ......... 73/23.31 |

* cited by examiner

DIGITIZATION OF FIELD ENGINEERING WORK PROCESSES AT A GAS TURBINE POWER PLANT THROUGH THE USE OF PORTABLE COMPUTING DEVICES OPERABLE IN AN ON-SITE WIRELESS LOCAL AREA NETWORK

This invention relates to data acquisition and control of machinery, and more particularly, to an apparatus and method for the digitization of field service engineering work processes at a gas turbine power plant using a communication network with wearable end user devices.

BACKGROUND OF THE INVENTION

During operation of power generation equipment, several factors may likely lead to faults, thus causing breakdown of machinery. Customers' desire to service power generation equipment places added emphasis on the availability and reliability of the equipment to ensure that it is operational and available to meet periods of peak demand.

In land based gas turbines used for power generation, a compressor must be allowed to operate at a higher pressure ratio to achieve a higher machine efficiency. A variety of tests may be performed to maintain a gas turbine engine in an operating condition. Conventionally, a testing engineer may attach measuring instruments at several locations on a gas turbine to measure gas turbine operation parameters. The measured values are then compared with specified parameters to determine whether the gas turbine meets the specified parameters which enable it to be placed in operation.

Gas turbine parameters are often measured using a variety of instruments. These instruments are used by a field engineer to measure engine parameters. Once the readings are determined to be outside of specified parameters, the field engineer communicates with a remote engineer who is responsible for controlling the various components such as valves, pumps, switches, etc. of the gas turbine. The field operations are labor intensive as multiple engineers are required to perform routine inspection and operational activities. In order to establish communication between personnel, radio or telephone links between the engineers are also required, thus further slowing down the inspection process. Access to remote services is also slow and often not in realtime, thus adding to inefficiencies.

Telephone line connections are normally used to establish corporate intranet connections or virtual private network (VPN) type of connections. The loss of information through a telephone line does not allow immediate use of applications, that are stored at a remote server, to be used at a point of service, i.e., in the field environment. The information that is stored at the remote server would have to be uploaded off-line after completing inspections. In addition, the inspections would have to be performed by multiple engineers communicating via telephone or radio connections. Loss of communication between the engineers is a common occurrence, especially if the engineers fail to share a common communication language. Furthermore, land line installation cycles require increased installation time when compared to a mobile satellite network which may be installed in a short period of time.

Thus, there is need to overcome the inefficiencies encountered by the prior art.

BRIEF SUMMARY OF THE INVENTION

Accordingly, this invention relates to a method and apparatus that enhances the productivity of field engineers through the combination of high bandwidth connectivity through satellite or landline connections, on-site wireless local area network (LAN) systems, and wearable computers operated by a field engineer. This combination allows digitization of work processes that in the past required multiple personnel to complete. Thus, the present invention allows a single engineer to operate the machinery (power plant or gas turbine engine), and simultaneously inspect the machinery.

Alternatively, the field engineer may measure the power plant parameters and perform tasks to manually control the power plant instead of remotely controlling the power plant by a software driven interface, such as, for example, a human machine interface. The field engineer may leverage the expertise of a remote engineer by providing the remote engineer with real-time data, video, and control connectivity in order to resolve the problem in a collaborative manner. For the purpose of this invention, a "wearable" device is defined to include systems that are adapted to be carried by a user.

The present apparatus includes at least one processor system having a controller for controlling a gas turbine. The processor system further receives operational data from a power plant. A wireless access point/interface device is communicatively coupled to the processor system for communicating the data received from the processor system to at least one of a mobile computing system and a wearable computer. The wearable computer is adapted to be carried by a mobile user/field engineer. The controller is capable of receiving instructions from the field engineer to control the gas turbine.

The system further includes a local area network (LAN) in communication with the wireless interface device. An antenna assembly having a transceiver system is employed for transmitting and receiving signals from the wireless interface device to a remote computer server device which is communicatively coupled to the antenna assembly via a wireless communication network. The server computer includes a database for storing application data accessible by the field engineer.

Thus, the present invention provides a high bandwidth connectivity to a field engineer or other remote worker in order to enable the use of web-portal applications, stored in a remote server, at the point of service of the field engineer. Immediate access to web portal applications is provided to the field engineer at a remote installation site via two-way satellite connectivity that does not otherwise have access to a landline telephone link.

In another embodiment, the present provides a remote user, monitoring a turbine, a capability to share information with another remote user monitoring a like turbine, such that the collaborative effort may be used to fine tune one turbine based on parameters or settings of the equivalent turbine at another remote site.

In one aspect, a system for digitization of work processes in a power plant having a gas turbine includes at least one processor system having a controller, the processor receiving power plant data, and the controller controlling the gas turbine; at least one interface device communicatively coupled to the processor system for communicating the data received from the processor system to at least one of a mobile computing system and a computer system carried by a mobile user; the controller capable of receiving instructions from the mobile user to control the gas turbine; a local area network (LAN) in communication with the at least one interface device; at least one antenna assembly having a transceiver system for transmitting and receiving signals from the at least one interface device; and a network server system communicatively coupled to the at least one antenna assembly via a wireless communication network, the server system including a database for storing application data accessible by the mobile user. The interface device preferably is a wireless access point interface, and the computer system carried by the user is a wearable computer. The access point is capable of communicating the data received from the processor system to the server computer via the LAN. The LAN comprises a wireless network, and a router.

The wireless network is preferably linked to the at least antenna assembly via an internet protocol (IP) data interface. The system further comprises a private branch exchange network (PBX); a voice over IP (VOIP) gateway coupled to the PBX; and an ethernet interface coupled the VOIP gateway and the IP data interface. The server computer comprises at least one router; a packet switching network communicatively coupled to the at least one router; and a wide area network (WAN) coupled to the at least one router for communicating data from the server computer to the antenna assembly via an orbiting satellite. The wireless access point is capable of operating on DC power.

In another aspect, a communication network for controlling a power plant having a gas turbine, the network comprising a controller coupled to the power plant to control the gas turbine; and at least one interface communicatively coupled to the controller, the interface communicating with at least one of a mobile computing system and a wearable computer carried by a mobile user, the controller receiving instructions from one of the mobile unit and the mobile user for controlling the gas turbine.

In yet another aspect, a power plant of the type having a gas turbine, a method of controlling the power plant comprising receiving power plant data by at least one processor system having a controller; forwarding the received data to at least one of a mobile unit and a wearable computer carried by a mobile user via an interface device; inspecting the received data to determine power plant operability; instructing the controller to vary the power plant operation. The method further comprises forwarding plant data to a remote user via a wireless communication network; receiving application data stored in a remote database system via the wireless communication network. The power plant operation is preferably varied by varying the operation of the gas turbine.

In further another aspect, a method of controlling a machine apparatus by a remote user includes receiving equipment data by at least one processor system having a controller; forwarding the received data to at least one of a mobile unit and a first wearable computer carried by a first mobile user via an interface device; inspecting the received data to determine equipment operational characteristics; forwarding the received data to a remote server via a wireless communication network; receiving, by the first wearable computer, application data stored in the remote server via the wireless communication network; and instructing the controller to vary the machine operation. The method further includes forwarding the received data from the first wearable computer carried by the first mobile user to a second wearable computer carried by a second mobile user; receiving feedback information from the second mobile user; and fine tuning the machine operation based on the feedback information. The received data is video related data.

DETAILED DESCRIPTION OF THE INVENTION

Figure 1:
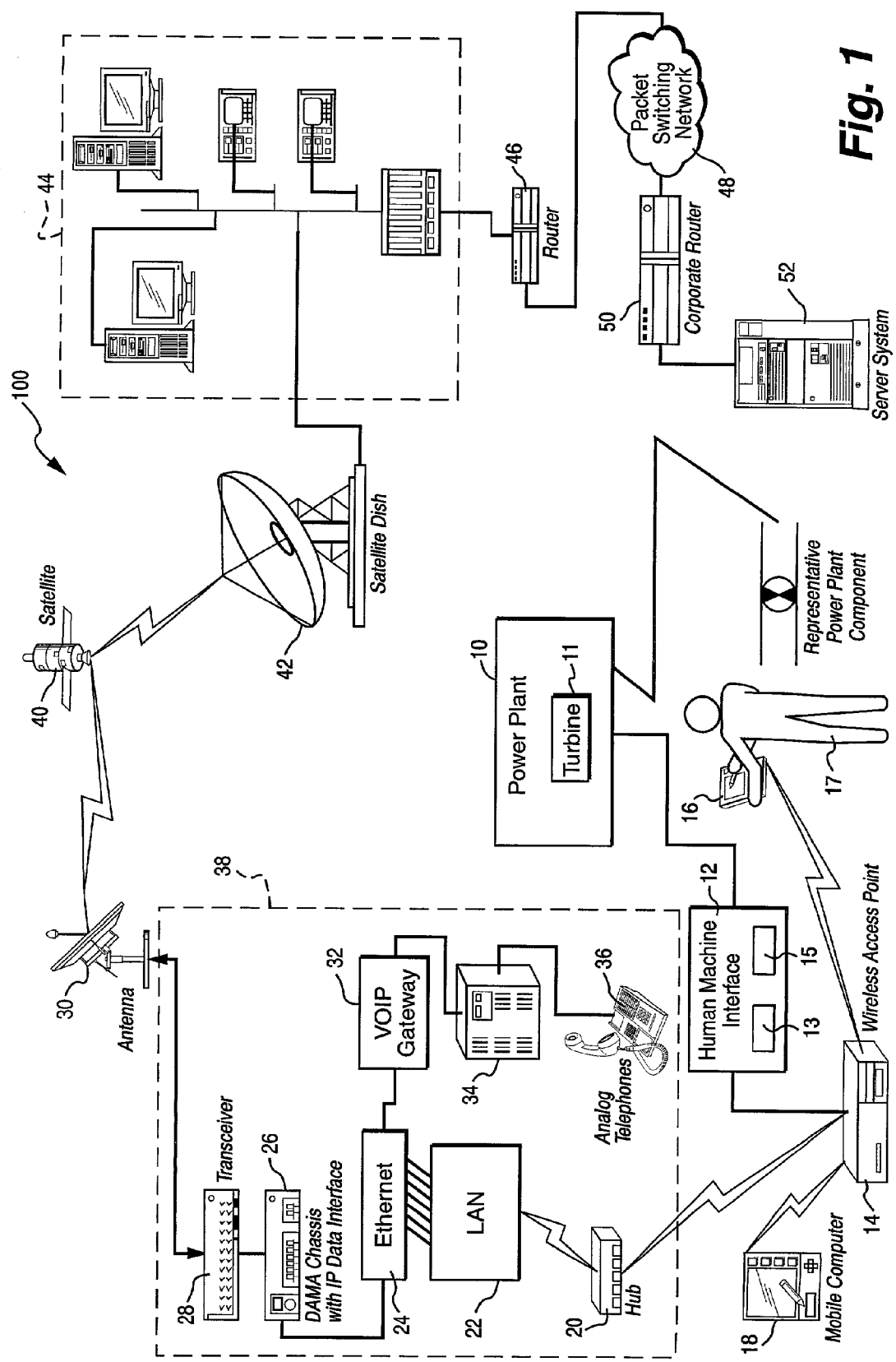
FIG. 1 is a schematic illustrating the inspection and control of power plant machinery according to the present invention.

Referring now to FIG. 1, there is shown a schematic diagram illustrating the inspection and control of power plant machinery according to the present invention. Here, a power plant generally indicated at 10 includes a gas turbine engine 11. Power plant 10 is coupled to a processor system 12 such as, for example, a "human machine interface (HMI)". Application software such as, for example, Netmeeting™ available from Microsoft Corporation, may be used to communicate data between processor system 12 and the wearable computer 16 carried by the mobile user 17. Operational data from gas turbine 11 are received by the processor system 12. The processor system 12 may include a database system 13 for storing operational data and forwarding the stored data to a wireless interface unit 14 such as, for example, a wireless access point. Operational data received by the interface unit 14 is communicated to at least one of a mobile computing unit 18 and a wearable computer 16, adapted to be carried by a mobile user 17. The wearable computer 16 is preferably of the type worn by field personnel for easy data entry. The processor system 12 includes a controller 15 for receiving instructions, from a field engineer/mobile user 17 carrying the wearable computer 16, and varying the operational parameters of gas turbine 11.

The mobile user 17 is communicatively linked to a corporate server system 52 via a network generally indicated at 38. Server 52 preferably includes a database system having a plurality of web portal applications stored therein for use by the mobile user 17. The web portal applications from server 52 are routed via a corporate router 50 and a communication network 48, such as, for example an ATM switching network. Switched signals from communication network 48 are transmitted through router 46 via a wide area network (WAN) interface 44 to be received by network 38 via an antenna assembly 30. Signals from WAN 44 are preferably transmitted in a wireless fashion, and preferably via a satellite 40. Network 38 preferably includes a satellite transceiver 28 communicatively coupled to satellite networking equipment such as a Single Channel Demand Assigned Multiple Access (DAMA) chassis with IP data interface 26 available from TIW Systems, Inc. Further, network 38 also includes an ethernet hub 24 with a 6-port wireless LAN 22, and a 4-port voice-over-internet-protocol (VOIP) gateway 32. Gateway 32 is coupled to a private-branch exchange (PBX) 34 for communicating voice data to users at location 36. Application data or web portal data from server 52 is transmitted to wireless interface 14 via a wireless hub 20. A mobile user 17 carrying wearable computer 16 may access the data received by the wireless interface 14. Mobile user 17 is thus capable of not only performing inspection, but also operate the power plant 10 by accessing power plant application data stored in server 52 to control the power plant 10.

Application data or web portal data from server 52 is transmitted to wireless interface 14 via a wireless hub 20. A mobile user 17 carrying wearable computer 16 may access the data received by the wireless interface 14. Mobile user 17 is thus capable of not only performing inspection, but also operate the power plant 10 by accessing power plant application data stored in server 52 to control the power plant 10.

Similarly, the mobile user 17 carrying wearable computer 16 may also transmit data gathered from power plant 10 to a remote user to achieve a collaborative resolution. Thus, a two-way communication between the mobile user 17 and a remote user capable of receiving information from mobile user 17 is permitted. It will be understood that the mobile user 17 is capable of performing operations to manually control the power plant 10 upon receiving power plant data via network 38.

Alternatively, voice signals from a remote user, for example, coupled to server 52 may be received at ethernet hub 24 via satellite 40 and antenna system 30. The received signals at hub 24 may be converted using a voice over internet protocol (VOIP) gateway 32 and forwarded to users at 36 via a private branch exchange unit 34. Likewise, users at 36 may also transmit voice signals to remote users communicatively coupled to system 100. It will be appreciated by one skilled in the art that the present invention need not be restricted to measuring and controlling operational characteristics of a power plant. In fact, the present invention may be applied to measure and control the operational characteristics of any machine by a remote engineer.

Figure 2:
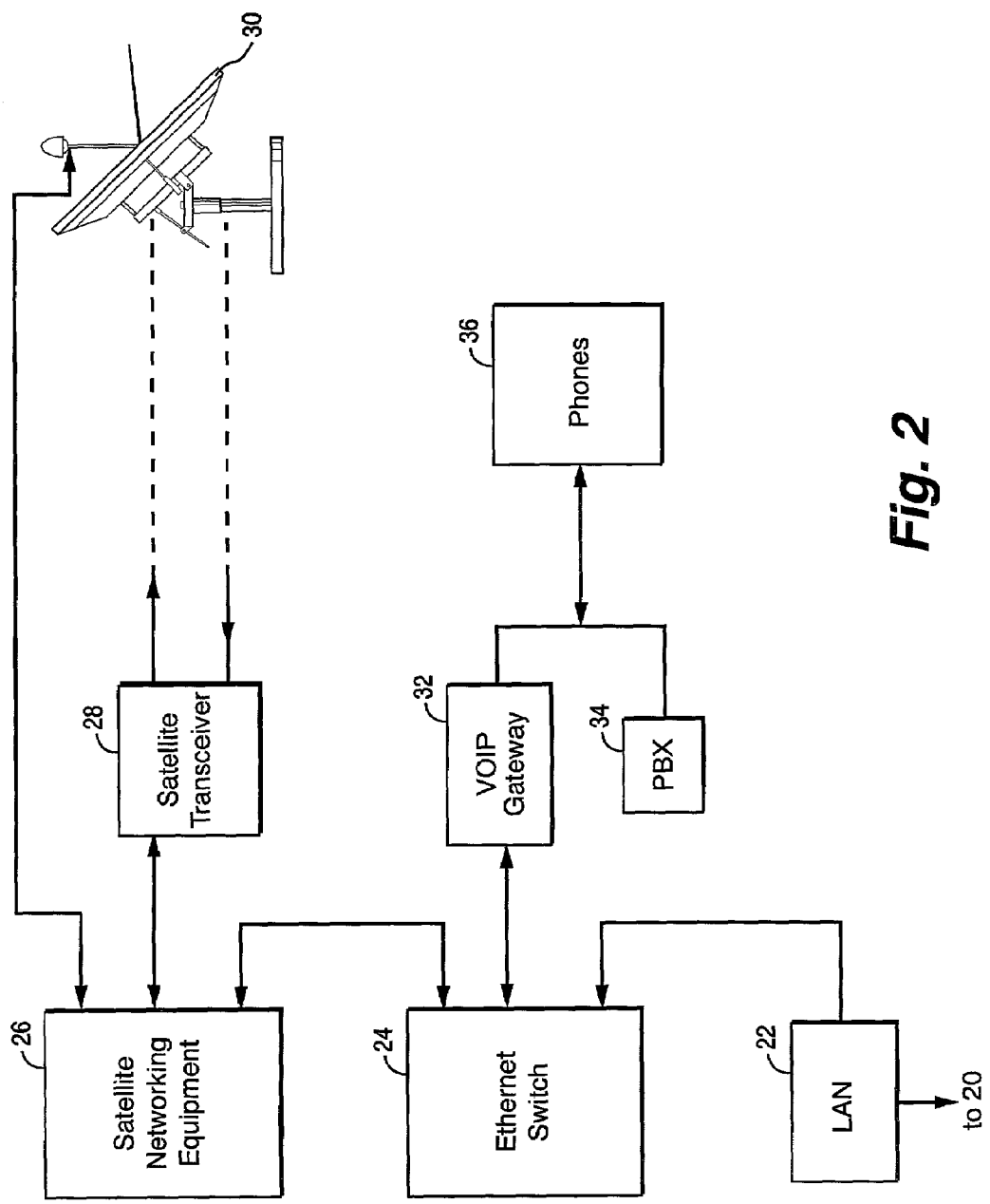
FIG. 2 is a high level diagram illustrating the communication network as shown in FIG. 1.
Figure 3:
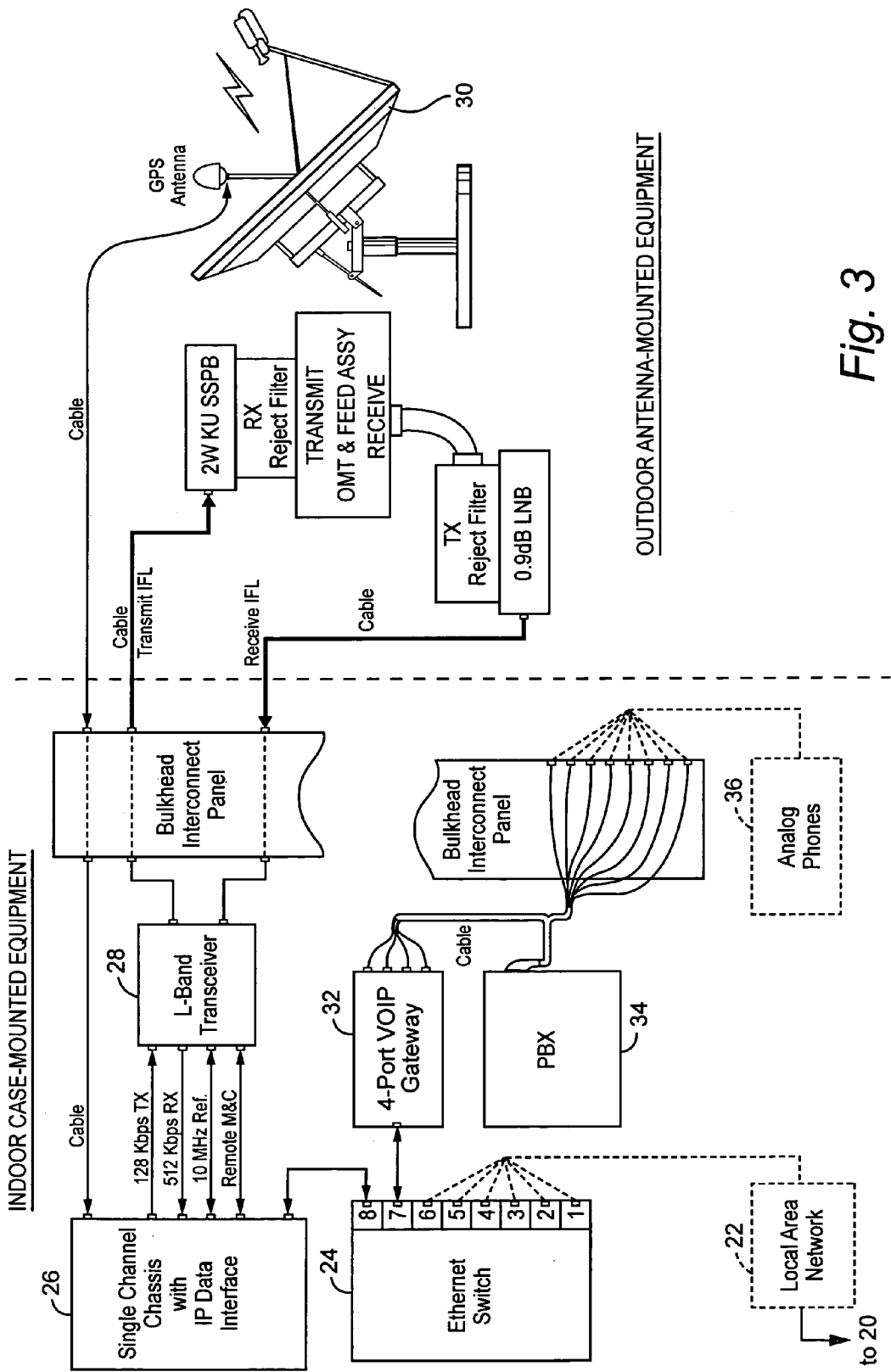
FIG. 3 illustrates a detailed version of the communication network as identified in FIG. 2.

Referring now to FIG. 2, there is shown a high level block diagram illustrating the details of antenna and transceiver interface with wireless LAN 22 as shown in FIG. 1. FIG. 3 illustrates a detailed diagram of the wireless communication network shown in FIG. 2.

Figure 4:
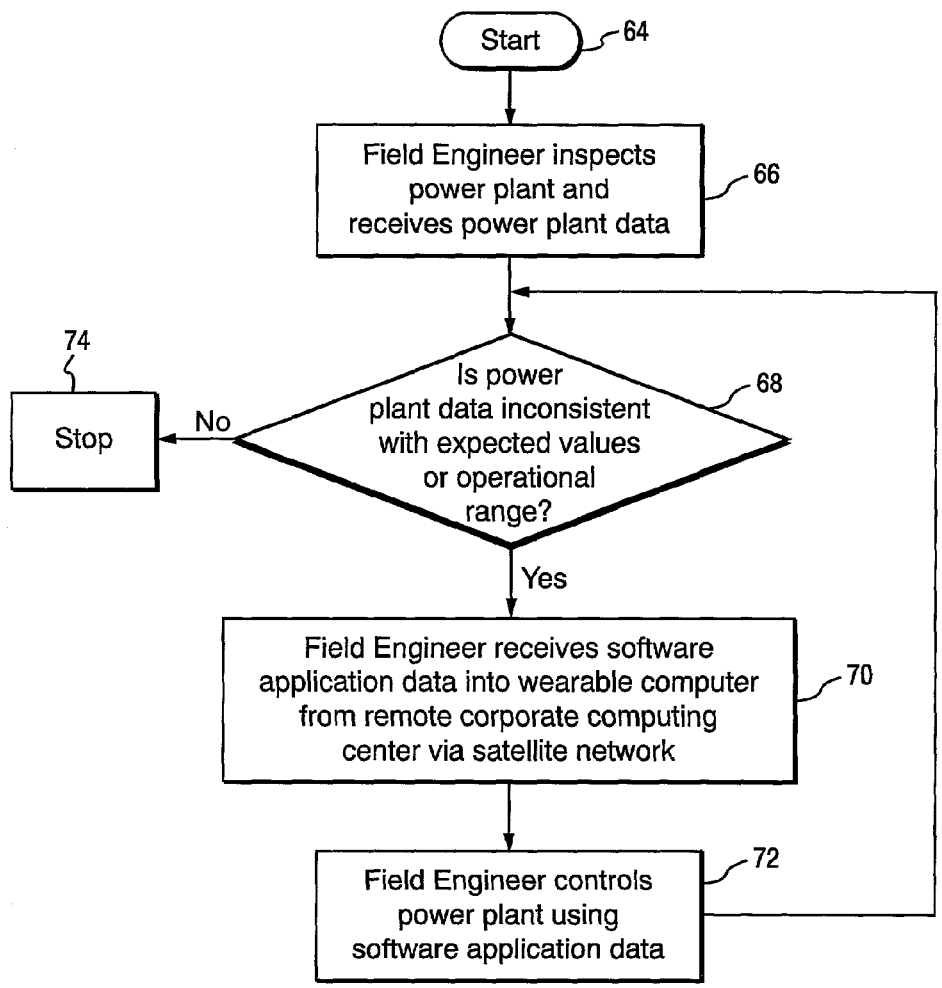
FIG. 4 illustrates a flow-chart to measure and control a power plant machinery by a remote field engineer.

Referring now to FIG. 4, there is shown a flow-chart to measure and control a power plant machinery by a remote field engineer/mobile user 17. The mobile user 17 starts the process of inspection as identified in step 64. During step 66, after performing inspection of the power plant 10, the mobile user 17 receives power plant data in the wearable computer 16, the data being communicated through wireless interface unit 14 and hub 20. At 68, the mobile user 17 determines whether or not the received power plant data is within predetermined parameters. If the received data is within acceptable parameters, then no further adjustments of the power plant are necessary and the process stops at step 74. If the received power plant data is outside of the predetermined range, then it is determined that active control of the power plant is needed. The mobile user 17 then downloads software applications 70 to the wearable computer 16 from corporate server system 52 via wireless network which, for example, includes components identified by numerals 38, 40, 14, 44, 46, 48, 50. After downloading the software applications to wearable computer 16, user 17 performs control functions, as indicated at step 72, to adjust the operational characteristics of the power plant 10. This process is a closed-loop process which is repeated until the measured power plant data lies within predetermined values.

Figure 5:
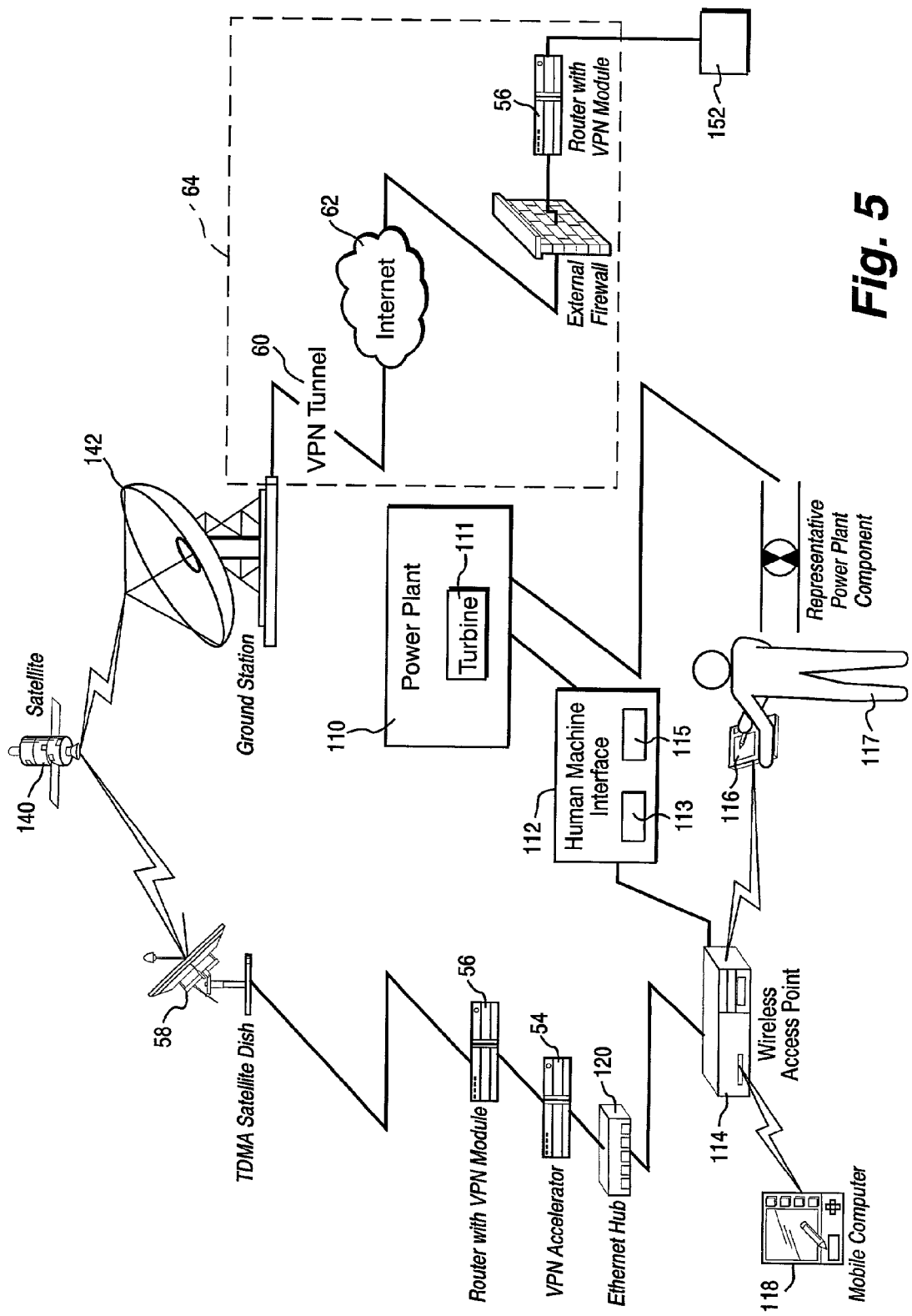
FIG. 5 is another embodiment of the present invention, specifically illustrating a communication network.

Referring now to FIG. 5, a second embodiment is illustrated wherein like elements as in the communication system of FIG. 1 are indicated by like reference numerals preceded by the prefix "1". Here, information from wireless access point 114 is forwarded through ethernet hub 120 to a virtual private network (VPN) accelerator 54, routed through router 56 and via satellite communications link 58, 140 and 142 to corporate network server 152 through communication network 64. The communication network 64 includes, for example, virtual private network (VPN) tunnel 60, and a packet switching network, such as for example, internet 62, and a router 56. It will be understood that the communication network shown in FIG. 5 is exemplary, and that various components may be added or removed without deviating from the spirit of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for digitization of field service engineering work processes in a power plant having a gas turbine, comprising:

at least one processor system having a controller, said at least one processor system receiving power plant data, and said controller controlling said gas turbine;

at least one wireless communications interface device communicatively coupled to said at least one processor system for wirelessly communicating the data received from the power plant by the processor system to at least one of a wireless mobile computer system or a wireless computer device carried by a mobile user, said controller configured to receive instructions from at least one of said wireless mobile computer system or said wireless computer device carried by a mobile user to control the gas turbine, enabling field service engineering work processes including inspection, monitoring and controlling a power plant gas turbine to be performed using said mobile computer system or said wireless computer system carried by said mobile user;

a local area network (LAN) including at least one wireless network comprising a wireless hub router and one or more wireless communication devices wherein at least one of said wirelessly communication devices is the wireless computer device carried by said mobile user;

a voice-over-Internet-protocol (VOIP) gateway coupled to said LAN;

at least one terrestrial orbiting satellite antenna assembly having a transceiver system for transmitting and receiving signals from said at least one wireless communications interface device; and a network server computer system communicatively coupled to said at least one terrestrial orbiting satellite communications antenna assembly via a wide area communication network, said server computer system including a database for storing application data accessible by the mobile user;

wherein said system for digitization of field service engineering processes enables a mobile user roving on site at a power plant location remote from the network server computer system to wirelessly communicate with both said gas turbine controller and said network server and to engage in two-way voice communications with other remote users communicatively coupled to said system for digitization by using VOIP communications for performing service engineering work processes including uploading and/or downloading computer software applications and data for performing inspection, operation or control of one or more gas turbine processes.

2. The system of claim 1 wherein said at least one wireless communications interface device is a wireless access point device, and said wireless computer system carried by said mobile user is a wearable computer.

3. The system of claim 2 wherein said access point device is capable of communicating the data received from the processor system to the server computer via said LAN.

4. The system of claim 1 wherein said LAN is linked to said at least one terrestrial orbiting satellite communications antenna assembly via an internet protocol (IP) data interface.

5. The system of claim 4 further comprises:
a private branch exchange network (PBX) coupled to said VOIP gateway; and
an ethernet interface coupled to said VOIP gateway and said IP data interface.

6. The system of claim 1 wherein said network server computer system comprises:
at least one router; and
an ATM network communicatively coupled to said at least one router.

7. The system of claim 6 further comprises:
a wide area network (WAN) coupled to said at least one router for communicating data from said network server computer system to said terrestrial orbiting satellite communications antenna assembly via an orbiting satellite.

8. The system of claim 2 wherein said wireless access point device is capable of operating on DC power.

9. A field engineering communication network for enabling a mobile field service engineer working at a power plant having a gas turbine to engage in two-way voice communications with other persons communicatively coupled to the network and to monitor operational parameters of the gas turbine and to upload and/or download computer software applications and operational parameter data to/from a remote server for performing on-site inspection, operation or control of the gas turbine via a wireless mobile device, said network comprising:
a controller processor system at said power plant to control the gas turbine;
a local area network (LAN) communicatively coupled to a remote field service engineering server and including at least one wireless communications access point interface communicatively coupled to said controller processor system, said interface communicating wirelessly with at least one of a wireless mobile computing system and a wireless wearable computer carried by a mobile user, said controller processor system providing operational parameter data and receiving instructions from at least one of said wireless mobile computing system and a wireless wearable computer carried by a mobile user for performing on-site inspection, operation or control of the gas turbine, wherein appropriate computer software applications, control data or instructions for controlling the operation of the gas turbine can be provided to at least one of said mobile unit and a wearable computer via wireless communications from a remote server field service engineering database; and
a voice-over-internet-protocol (VOIP) gateway coupled to said LAN for enabling two-way voice communications over said network between said mobile field service engineering database and at least one other user communicatively coupled to said VOIP gateway.

10. The system of claim 9 further comprises:
a local area network (LAN) in communication with said at least one wireless communications access point interface;
at least one terrestrial satellite communications system communicatively coupled to said LAN for transmitting and receiving signals to and from said at least one wireless communications access point interface; and
at least one network server computer system communicatively coupled to said at least one terrestrial satellite communications system via an orbiting satellite communication link, said server computer system including a database for storing application data accessible by the mobile user.

11. The system of claim 9 wherein said wireless network is linked to said at least one terrestrial satellite communications antenna assembly via an internet protocol (IP) data interface.

12. The system of claim 11 further comprises:
a private branch exchange network (PBX) coupled to said VOIP gateway; and
an ethernet interface coupled to said VOIP gateway and said IP data interface.

13. The system of claim 10 wherein said server computer system comprises:
at least one router;
a packet switching network communicatively coupled to said at least one router; and
a wide area network (WAN) coupled to said at least one router for communicating data from said server computer system to said terrestrial satellite communications antenna assembly.

* * * * *